(12) United States Patent
Schröder et al.

(10) Patent No.: US 8,842,949 B2
(45) Date of Patent: Sep. 23, 2014

(54) SINGLE PHOTON EMISSION SYSTEM

(75) Inventors: Tim Schröder, Berlin (DE); Oliver Benson, Berlin (DE); Andreas Schell, Berlin (DE); Philip Engel, Berlin (DE); Moritz Julian Banholzer, Berlin (DE); Friedemann Gädeke, Berlin (DE); Gerhard Birkl, Darmstadt (DE)

(73) Assignees: Technische Universitat Darmstadt, Darmstadt (DE); Humbolt-Universitat zu Berlin, Berlin (DE)

( * ) Notice: Subject to any disclaimer, the term of this patent is extended or adjusted under 35 U.S.C. 154(b) by 866 days.

(21) Appl. No.: 12/874,995

(22) Filed: Sep. 2, 2010

(65) Prior Publication Data
US 2012/0056111 A1    Mar. 8, 2012

(51) Int. Cl.
| | |
|---|---|
| G02B 6/26 | (2006.01) |
| H04B 10/00 | (2013.01) |
| H04B 10/70 | (2013.01) |
| G02B 6/32 | (2006.01) |
| G02B 6/42 | (2006.01) |

(52) U.S. Cl.
CPC ............... *H04B 10/30* (2013.01); *G02B 6/262* (2013.01); *H04B 10/70* (2013.01); *G02B 6/32* (2013.01); *G02B 6/4206* (2013.01)
USPC .......................................................... 385/39

(58) Field of Classification Search
None
See application file for complete search history.

(56) References Cited

U.S. PATENT DOCUMENTS

| | | |
|---|---|---|
| 6,141,367 A | 10/2000 | Fan et al. |
| 2001/0016095 A1 | 8/2001 | Tomita |
| 2006/0187993 A1 | 8/2006 | Lukishova et al. |
| 2006/0280414 A1 | 12/2006 | Beausoleil et al. |
| 2007/0007507 A1 | 1/2007 | Deveaud-Pledran et al. |
| 2009/0022491 A1* | 1/2009 | Takemoto ...................... 398/34 |
| 2009/0034737 A1 | 2/2009 | Trifonov |
| 2009/0140275 A1 | 6/2009 | Santori et al. |

FOREIGN PATENT DOCUMENTS

| | | |
|---|---|---|
| GB | 2 378 319 A | 2/2003 |
| WO | WO 2009/017579 A1 | 2/2009 |
| WO | WO 2009/105814 A1 | 9/2009 |

OTHER PUBLICATIONS

Bissell L. J. et al; "Single Photon Source on Demand Based on Single-Colloidal-Quantum-Dot Fluorescence in Chiral Photonic Bandgap Liquid Crystal Hosts"; CLEO '07. 2007 Conference on Lasers and Eelectro-Optics, May 5, 2011, Baltimore, Maryland, US, OSA; Piscataway, New Jersey, US, May 6, 2011; 2 pgs.

International Search Report and Written Opinion; PCT/EP2011/064223; Nov. 4, 2011; 13 pgs.

Examination Report German Application No. 10 2011 005 327.1 dated Sep. 6, 2012.

* cited by examiner

*Primary Examiner* — Sung Pak
(74) *Attorney, Agent, or Firm* — Foley & Lardner LLP

(57) ABSTRACT

An embodiment of the invention relates to a single photon emission system having a proximal end, a distal end, and a single photon emitter located between the proximal end and the distal end; wherein the single photon emission system is adapted to guide optical pump radiation, which is inputted at the proximal end to optically excite the single photon emitter, along a predefined direction that runs from the proximal end to the distal end; and wherein single photons emitted by said single photon emitter, are guided along said predefined direction to the distal end.

20 Claims, 7 Drawing Sheets

SINGLE PHOTON EMISSION SYSTEM

The invention relates to a single photon emission system. Hereinafter, the terms "optical radiation" and "light" refer to any sort of electromagnetic radiation of any wavelength, whether visible or not.

BACKGROUND OF THE INVENTION

A single photon emission system is described in the International Patent Application WO 2009/105814 A1. A pump source generates optical pump radiation which is directed to a single photon emitter by a microscope objective. The optical pump radiation optically excites the single photon emitter to emit single photons which are transmitted to the microscope objective. The propagation direction of the single photons is opposite to the propagation direction of the optical pump radiation. A beam splitter is used to separate the back-travelling single photons from the optical pump radiation.

OBJECTIVE OF THE PRESENT INVENTION

An objective of the present invention is to provide a single photon emission system which may be realized more compact compared to former single photon emission systems.

A further objective of the present invention is to provide a single photon emission system which achieves a high efficiency with regard to the emission of single photons.

BRIEF SUMMARY OF THE INVENTION

An embodiment of the present invention relates to a single photon emission system having a proximal end, a distal end, and a single photon emitter located between the proximal end and the distal end; wherein the single photon emission system is adapted to guide optical pump radiation, which is inputted at the proximal end to optically excite the single photon emitter, along a predefined direction that runs from the proximal end to the distal end; and wherein single photons emitted by said single photon emitter, are guided along said predefined direction to the distal end.

According to this embodiment the propagation direction of the emitted single photons corresponds to the propagation direction of the optical pump radiation. This allows to provide two separate radiation paths: A first radiation path may be optimized for providing pump radiation to the single photon emitter; and a second radiation path may be optimized for guiding the single photons separately to a separate output of the single photon emission system. Thus, the "pump radiation" path and the "single photon" path may be optimized individually.

Furthermore, very compact single photon emission systems may be fabricated since external devices like beam splitters for separating an ingoing optical pump radiation beam from outgoing single photons are not necessary.

Preferably, the photon emission system comprises a section where the refractive index increases along the predefined direction. If the single photon emitter is positioned in this section, the majority of photons will be emitted along the predefined direction and reach the distal end.

In a preferred embodiment a first material and a second material are arranged adjacent to the single photon emitter, wherein the first material is closer to the proximal end than the second material, and has a lower refractive index than the second material.

In order to achieve a compact system, the single photon emitter may be arranged at a surface of a lens. E.g., the lens may have a flat (or planar) surface, and the single photon emitter may be arranged at the flat (or planar) surface of the lens.

According to further preferred embodiments, the lens is a solid immersion lens or a gradient index lens.

The single photon emission system may comprise a first subsystem connected to the proximal end and configured to guide the optical pump radiation along the predefined direction, and a second subsystem optically coupled to the first subsystem and configured to guide the single photons emitted by the single photon emitter along the predefined direction to the distal end. In order to enable an easy alignment of the pump radiation towards the single photon emitter, the first and second subsystems may be pre-assembled, however, this is not mandatory.

The single photon emitter is preferably arranged at or adjacent to the interface between the first and second subsystems.

The first subsystem may comprise a filter adapted to attenuate fluorescence radiation generated inside the first subsystem in response to the optical pump radiation.

The second subsystem may comprise a filter adapted to attenuate the optical pump radiation.

The single photon emission system preferably comprises a filter adapted to reflect the optical pump radiation and create an optical pump radiation field maximum at the location of the single photon emitter.

The single photon emission system may further comprise a first and second fiber each having an end facet, wherein the single photon emitter is arranged between the end facets of the first and second fibers.

A filter may be arranged at the end facet of the first fiber. This filter preferably attenuates fluorescence radiation generated inside the first fiber in response to the optical pump radiation.

Furthermore, a filter may be arranged at the end facet of the second fiber for attenuating the optical pump radiation.

The end facet of the first and/or second fiber may have a at least partly curved surface. The single photon emitter is preferably arranged between the curved surfaces of the end facets of the first and second fiber.

According to another preferred embodiment, a first subsystem may comprise a first fiber having an end facet arranged at the interface between the first subsystem and a second subsystem. The second subsystem may comprise a second fiber having an end facet also arranged at the interface between the first and second system. A first filter may be arranged at the end facet of the first fiber, and may attenuate fluorescence radiation generated inside the first fiber in response to the optical pump radiation and reflect the single photons emitted by the single photon emitter. Further, a second filter may be arranged at the end facet of the second fiber, and may attenuate the optical pump radiation and reflect the single photons emitted by the single photon emitter. Preferably, the reflection of the second filter is lower than that of the first filter.

According to a further preferred embodiment, a light shade may be arranged in the radiation path. The light shade may attenuate an inner section of the radiation beam of the optical pump radiation.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended figures. Understanding that these figures depict only typical embodiments of the invention and are therefore not to be considered to be limiting of its scope, the invention will be described and explained with additional specificity and detail by the use of the accompanying drawings in which.

DETAILED DESCRIPTION OF PREFERRED EMBODIMENTS

The preferred embodiments of the present invention will be best understood by reference to the drawings, wherein identical or comparable parts are designated by the same reference signs throughout.

It will be readily understood that the present invention, as generally described herein, could vary in a wide range. Thus, the following more detailed description of the exemplary embodiments of the present invention, is not intended to limit the scope of the invention, as claimed, but is merely representative of presently preferred embodiments of the invention.

Figure 1:
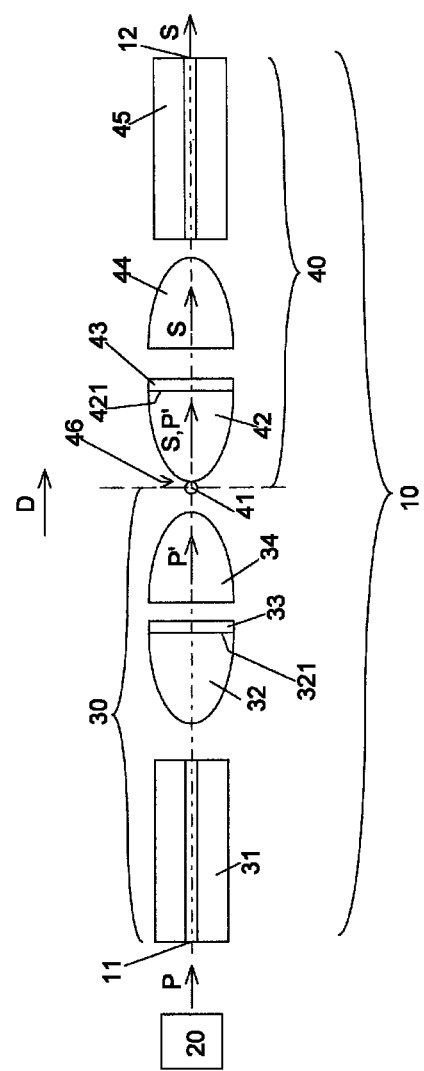
FIGS. 1-7 show exemplary embodiments of a single photon emission system according to the present invention.

FIG. 1 shows a first exemplary embodiment of a single photon emission system 10. The single photon emission system 10 comprises a proximal end 11, and a distal end 12. The proximal end 11 of the single photon emission system 10 is optically coupled to an external pump laser 20 which generates an optical pump radiation (pump light) P. The optical pump radiation P is inputted into the proximal end 11 of the single photon emission system 10.

The single photon emission system 10 comprises a first subsystem 30 and a second subsystem 40 which is optically coupled to the first subsystem 30.

The first subsystem 30 is connected to the proximal end 11 and guides the optical pump radiation P along a predefined direction which is indicated by an arrow D in FIG. 1. The first subsystem 30 comprises a first waveguide 31, a first lens 32, a first filter 33, and a second lens 34. The first waveguide 31 guides the optical pump radiation P to the first lens 32 which inputs the optical pump radiation P into the first filter 33.

The first filter 33 attenuates fluorescence radiation that is generated inside the first waveguide 31 in response to the optical pump radiation P. The attenuation of the fluorescence radiation may be based on absorption and/or reflection of the fluorescence radiation. As can be seen in FIG. 1, the first filter 33 is preferably arranged on a flat (or planar) surface 321 of the first lens 32. The first filter 33 may consist of one or more layers of material deposited on the flat surface 321.

The second lens 34 focuses the filtered optical pump radiation P' onto a single photon emitter 41 which is arranged on the outer surface of a lens 42 and thus at the interface between the first and second subsystems 30 and 40.

The lens 42 forms a third lens of the single photon emission system 10 and is positioned at the second subsystem 40. The second subsystem 40 further comprises a filter 43 that forms a second filter of the single photon emission system 10, a lens 44 that forms a fourth lens of the single photon emission system 10, and a waveguide 45 that forms a second waveguide of the single photon emission system 10.

The filtered optical pump radiation P', which is focused on the single photon emitter 41 by the second lens 34, optically excites the single photon emitter 41 to emit single photons S.

As mentioned above, the single photon emitter 41 is arranged at the outer surface of the third lens 42. Preferably, the third lens 42 consists of a material having a higher refractive index than the material 46 adjacent thereto. E.g., the third lens 42 may consist of glass, and the adjacent material 46 may be air or a polymer material. As such, two different materials, namely the material of the third lens 42 and the material 46, are arranged adjacent to the single photon emitter 41, wherein the refractive index increases along the predefined direction D. Due to the increase of the refractive index, single photons S emitted by the single photon emitter 41 will primarily be directed to the right hand side (versus the second systems 40) in FIG. 1 and thus in direction of the distal end 12. Only a minority of single photons will be emitted to the other direction (i.e. opposite to the predefined direction D) into the first subsystem 30 and head towards the proximal end 11.

The single photons S emitted by the single photon emitter 41 as well as the residual filtered optical pump radiation P' are directed to the second filter 43 which attenuates the optical pump radiation P'. The single photons S however pass the second filter 43 and are coupled into the second waveguide 45 by the fourth lens 44. The second waveguide 45 guides the single photons S along the direction D to the distal end 12 where they leave the single photon emission system 10.

The second filter 43 is preferably arranged on a flat (or planar) surface 421 of the third lens 42. The second filter 43 may consist of one or more layers of material deposited on the flat surface 421.

The first subsystem 30 and the second subsystem 40 are preferably preassembled such that both systems 30 and 40 are movable relative to each other in order to allow for a precise alignment between the focus of the second lens 34 positioned at the first subsystem 30, and the single photon emitter 41 positioned at the second subsystem 40.

The first, second, third, and/or fourth lens 32, 34, 42, and 44 are preferably gradient index (GRIN) lenses.

Figure 2:
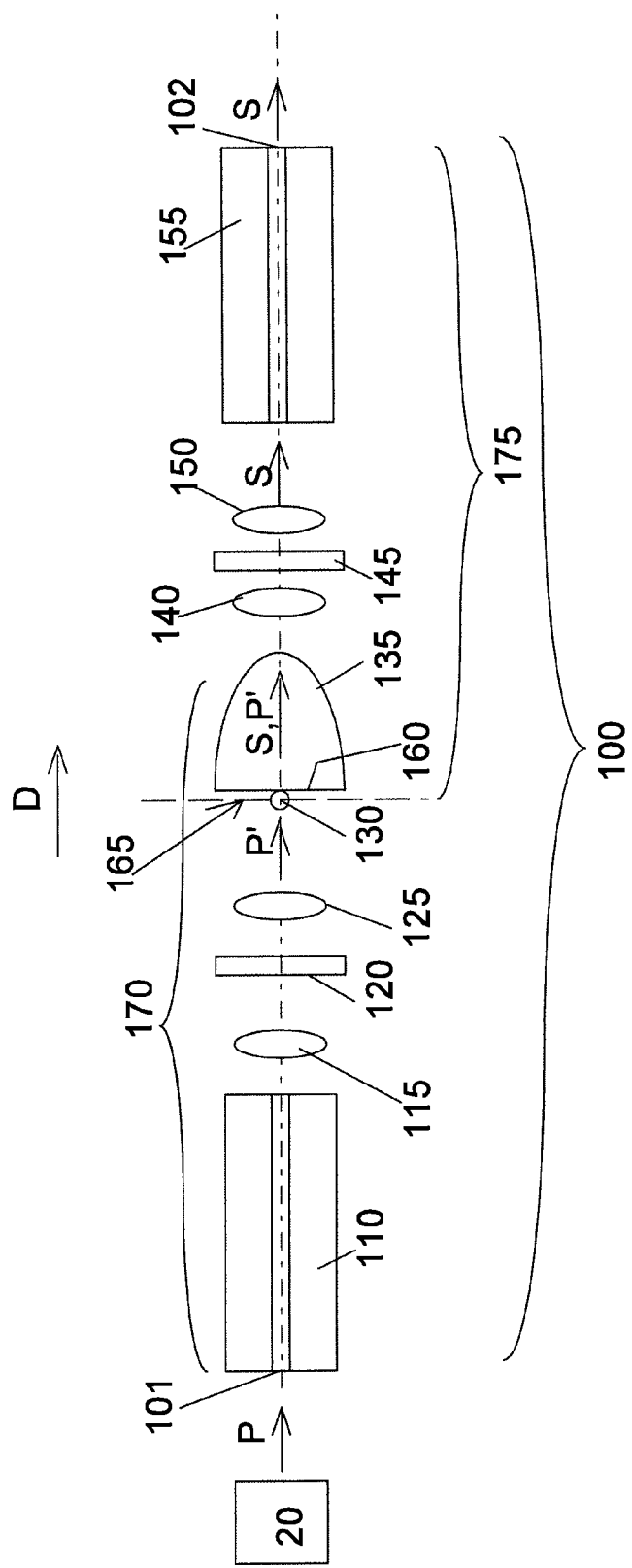

FIG. 2 shows a second exemplary embodiment of a single photon emission system 100. The single photon emission system 100 comprises a first waveguide 110 connected to a proximal end 101 of the single photon emission system 100, a first lens 115, a first filter 120, a second lens 125, a single photon emitter 130, a third lens 135, a fourth lens 140, a second filter 145, a fifth lens 150, and a second waveguide 155 connected to a distal end 102 of the single photon emission system 100.

The third lens 135 preferably is a solid immersion lens. The single photon emitter 130 may be arranged on a flat (or planar) surface 160 of the third lens 135. Preferably, the third lens 135 consists of a material having a higher refractive index than the material 165 adjacent thereto. E.g., the third lens 135 may consist of glass, and the adjacent material 165 may be air or a polymer material. As such, two different materials, namely the material of the third lens 135 and the material 165, are arranged adjacent to the single photon emitter 130, wherein the refractive index increases along the predefined direction D. Due to the increase of the refractive index, single photons S emitted by the single photon emitter 130 will primarily be directed to the right hand side and thus in direction of the distal end 102. Only a minority of single photons will be emitted to the other direction (i.e. opposite to the predefined direction D) and head towards the proximal end 101.

The first filter 120 attenuates fluorescence radiation that is generated inside the first waveguide 110 in response to the optical pump radiation P. The attenuation of the fluorescence radiation may be based on absorption and/or reflection of the fluorescence radiation.

The second lens 125 focuses the filtered optical pump radiation P' onto the single photon emitter 130 which is arranged on the outer surface of the third lens 135. The filtered optical pump radiation P' optically excites the single photon emitter 130 to emit the single photons S.

The single photons S emitted by the single photon emitter 130 as well as the residual filtered optical pump radiation P' are guided to the second filter 145 which attenuates the optical pump radiation P'. The single photons S pass the second filter 145 and are coupled into the second waveguide 155 by the fifth lens 150. The second waveguide 155 guides the single photons S along the direction D to the distal end 102 where they leave the single photon emission system 100.

The single photon emission system 100 may consist of two preassembled subsystems 170 and 175. The first waveguide 110, the first lens 115, the first filter 120, and the second lens 125 may belong to the first preassembled subsystem 170. The single photon emitter 130, the third lens 135, the fourth lens 140, the second filter 145, the fifth lens 150, and the second waveguide 155 may belong to the second preassembled subsystem 175. Of course, the preassembling of subsystems is not mandatory and just a preferred embodiment.

Figure 3:
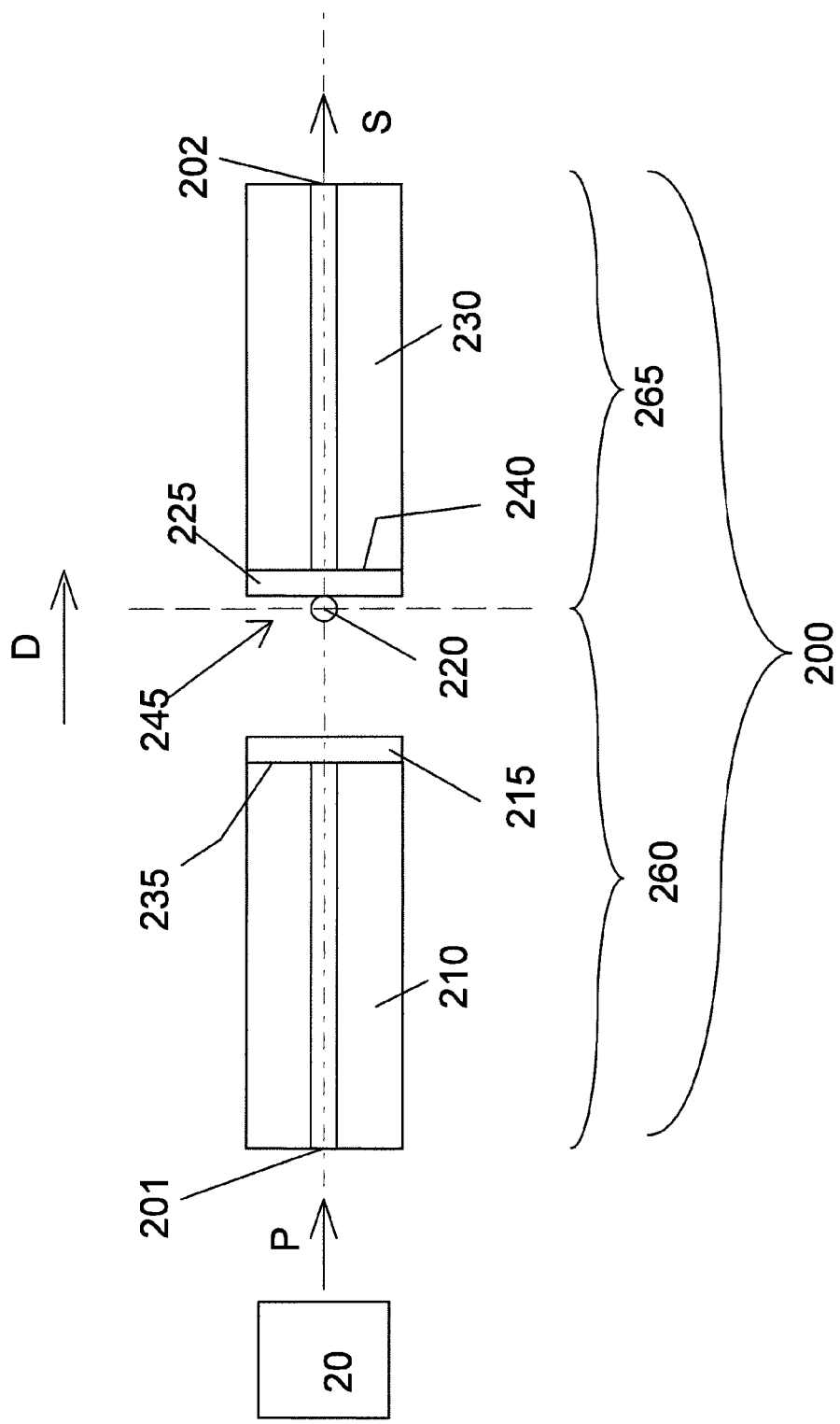

FIG. 3 shows a third exemplary embodiment of a single photon emission system. The single photon emission system 200 comprises a first waveguide 210 connected to a proximal end 201 of the single photon emission system 200, a first filter 215, a single photon emitter 220, a second filter 225, and a second waveguide 230 connected to a distal end 202 of the single photon emission system 200.

The first filter 215 is arranged on a plane (or planar) surface 235 of the end facet of the first waveguide 210 and configured to attenuate fluorescence radiation that is generated inside the first waveguide 210 in response to the optical pump radiation P. The attenuation of the fluorescence radiation may be based on absorption and/or reflection of the fluorescence radiation.

The second filter 225 is arranged on a plane (or planar) surface 240 of the end facet of the second waveguide 230 and configured to attenuate the optical pump radiation. The single photons S however pass the second filter 225 and are coupled into the second waveguide 230. The second waveguide 230 guides the single photons S along the direction D to the distal end 202 where they leave the single photon emission system 200.

Preferably, the second filter 225 consists of a material having a higher refractive index than the adjacent material 245. As such, two different materials, namely the material of the second filter 225 and the material 245, are arranged adjacent to the single photon emitter 220, wherein the refractive index increases along the predefined direction D. Due to the increase of the refractive index, single photons S emitted by the single photon emitter 220 will primarily be directed to the right hand side and thus in direction of the distal end 202. Only a minority of single photons will be emitted to the other direction (i.e. opposite to the predefined direction D) and head towards the proximal end 201.

The first waveguide 210 and the first filter 215 may form a first subsystem 260. The single photon emitter 220, the second filter 225, and the second waveguide 230 may form a second subsystem 265.

Figure 4:
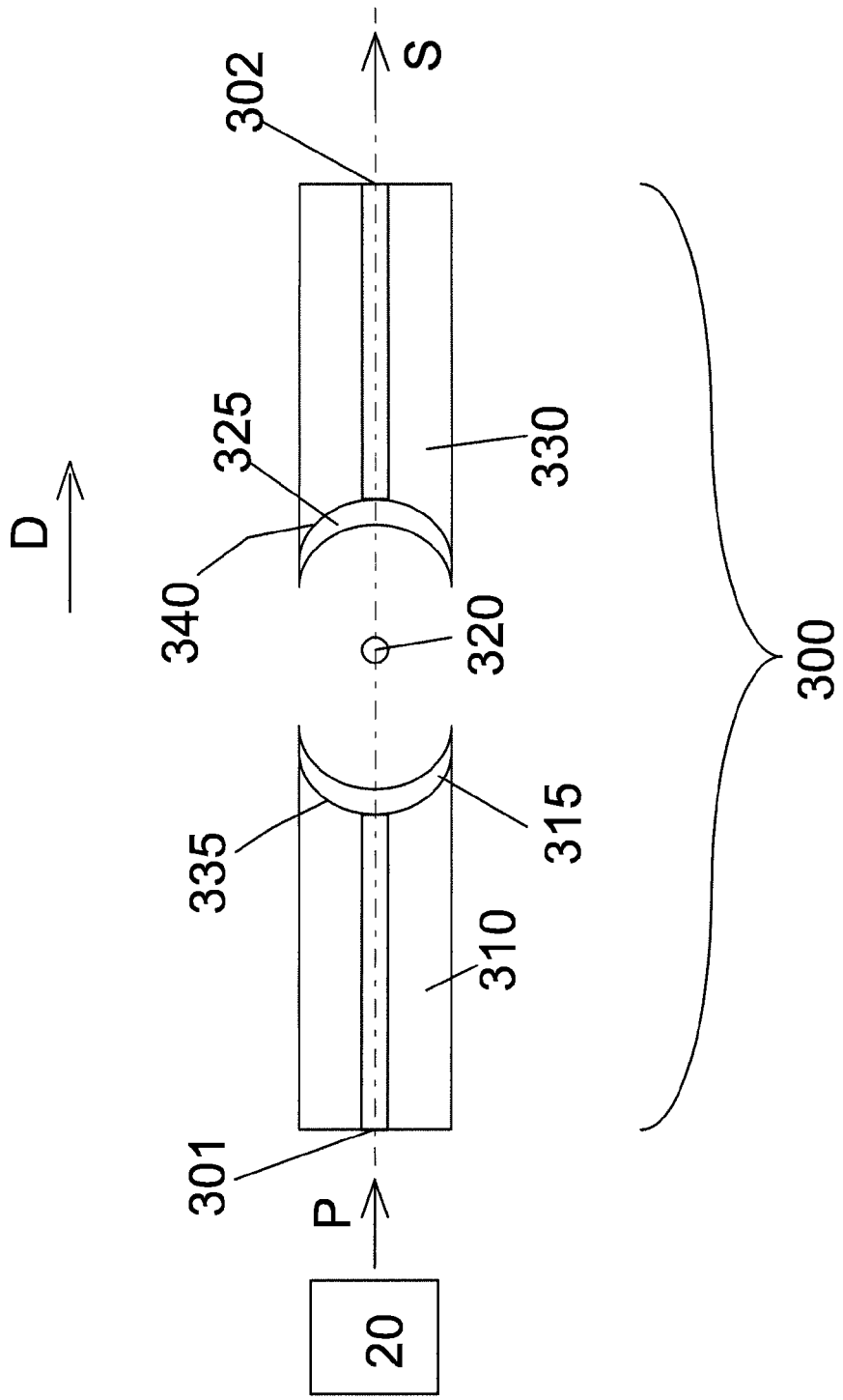

FIG. 4 shows a fourth exemplary embodiment of a single photon emission system. The single photon emission system 300 comprises a first waveguide 310 connected to a proximal end 301 of the single photon emission system 300, a first filter 315, a single photon emitter 320, a second filter 325, and a second waveguide 330 connected to a distal end 302 of the single photon emission system 300.

The first filter 315 is arranged on a curved, preferably concave, surface 335 of the end facet of the first waveguide 310. The second filter 325 is arranged on a curved, preferably concave, surface 340 of the end facet of the second waveguide 330. Filter 315 reflects the fluorescence radiation caused by the pump radiation, and filter 325 filters the pump radiation and creates an optical pump radiation field maximum at the location of the single photon emitter 320. Filters 315 and 325 further reflect the emitted single photons S.

The reflection of the second filter 325 for the single photons is lower than that of the first filter 315. As such, the majority of single photons S leave the cavity (resonator) or section between the first and second filters on the right hand side in FIG. 4 and reach the distal end 302 of the single photon emission system 300.

Figure 5:
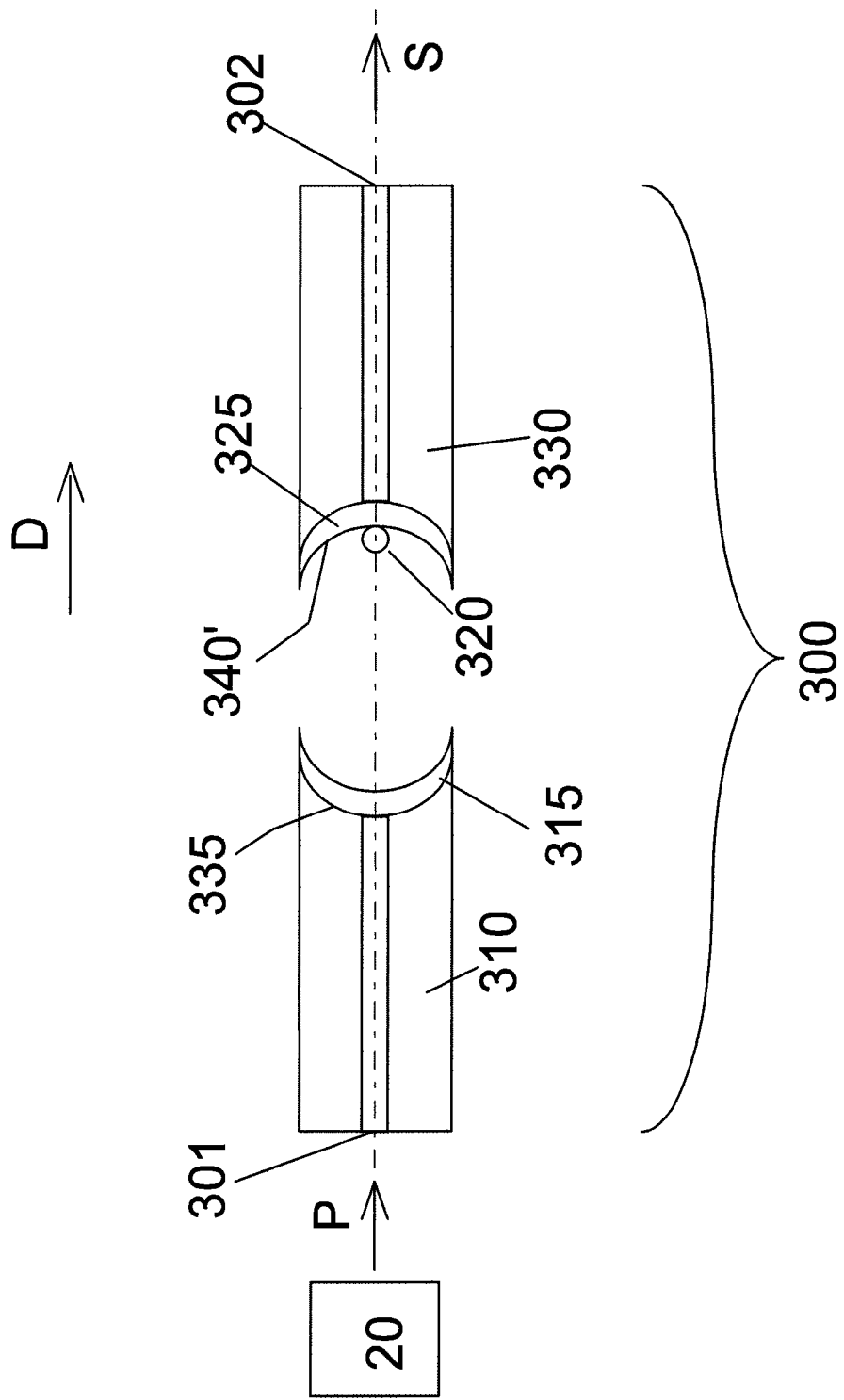

FIG. 5 shows a fifth exemplary embodiment of a single photon emission system. The single photon emission system 300 largely corresponds to the fourth embodiment shown in FIG. 4. In contrast thereto, the single photon emitter 320 of FIG. 5 is arranged on the curved surface 340' of the second filter 325.

Figure 6:
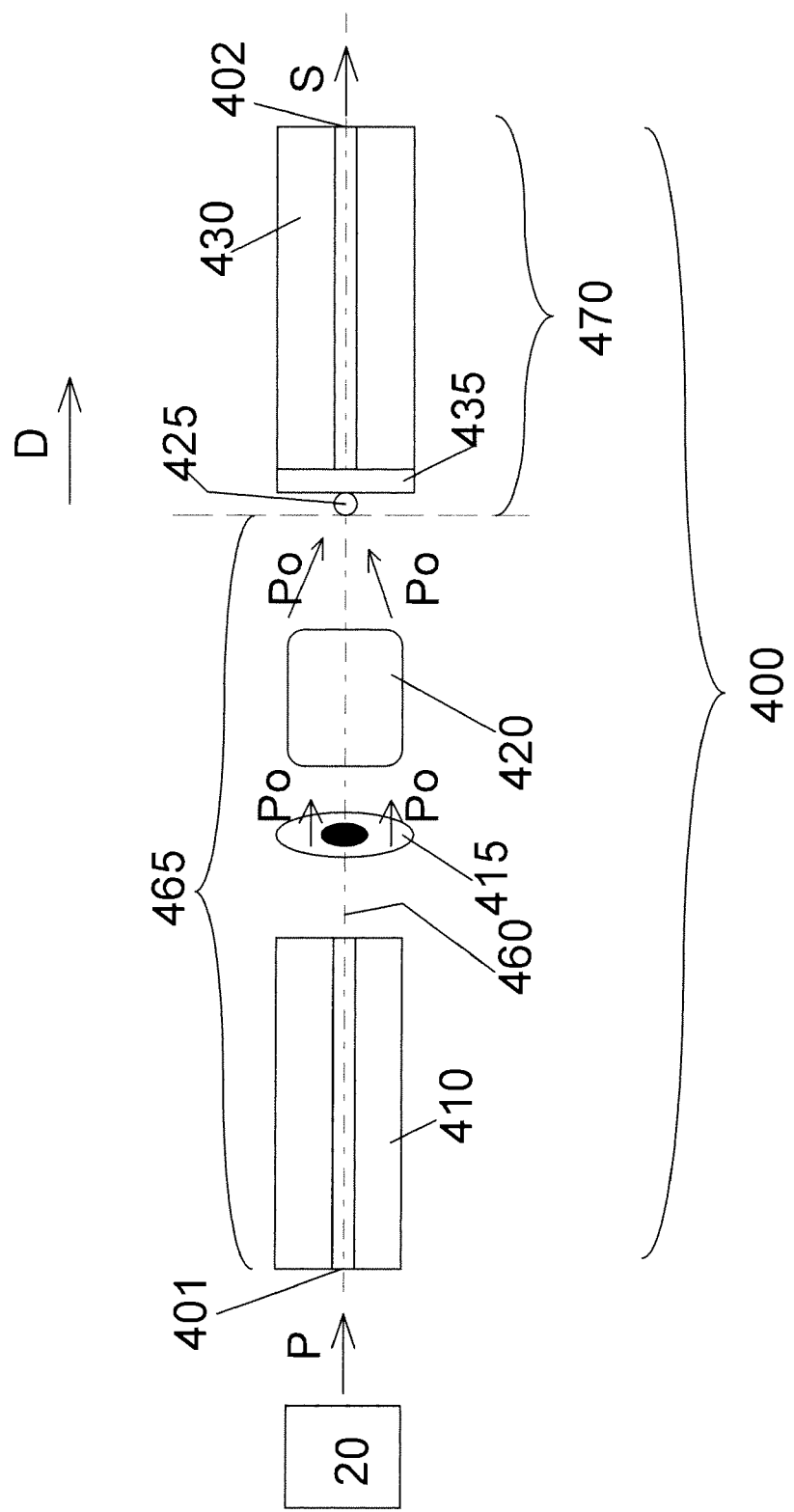

FIG. 6 shows a sixth exemplary embodiment of a single photon emission system. The single photon emission system 400 comprises a first waveguide 410 connected to a proximal end 401 of the single photon emission system 400, a light shade 415, a focus system 420, a single photon emitter 425, and a second waveguide 430 connected to a distal end 402 of the single photon emission system 400.

The light shade 415 is arranged in the radiation path and attenuates an inner section of the radiation beam of the optical pump radiation. As such, only the outer beam rays Po may enter the focus system 420 and reach the single photon emitter 425. However, the outer beam rays are angled relative to the main axis 460 and therefore cannot efficiently couple into the second waveguide 430. The amount of optical pump radiation, which enters the second waveguide 430, is thus very small.

In order to further attenuate the residual optical pump radiation, which nonetheless couples into the second waveguide 430, a filter 435 may be arranged in the beam path between the single photon emitter 425 and the distal end 402 of the single photon emission system 400.

The single photon emitter 425 may be positioned on the end facet of the second waveguide 430 or at the outer surface of filter 435 as shown in FIG. 6.

The components of the single photon emission system 400 may be arranged in two subsystems 465 and 470 as indicated in FIG. 6.

Figure 7:
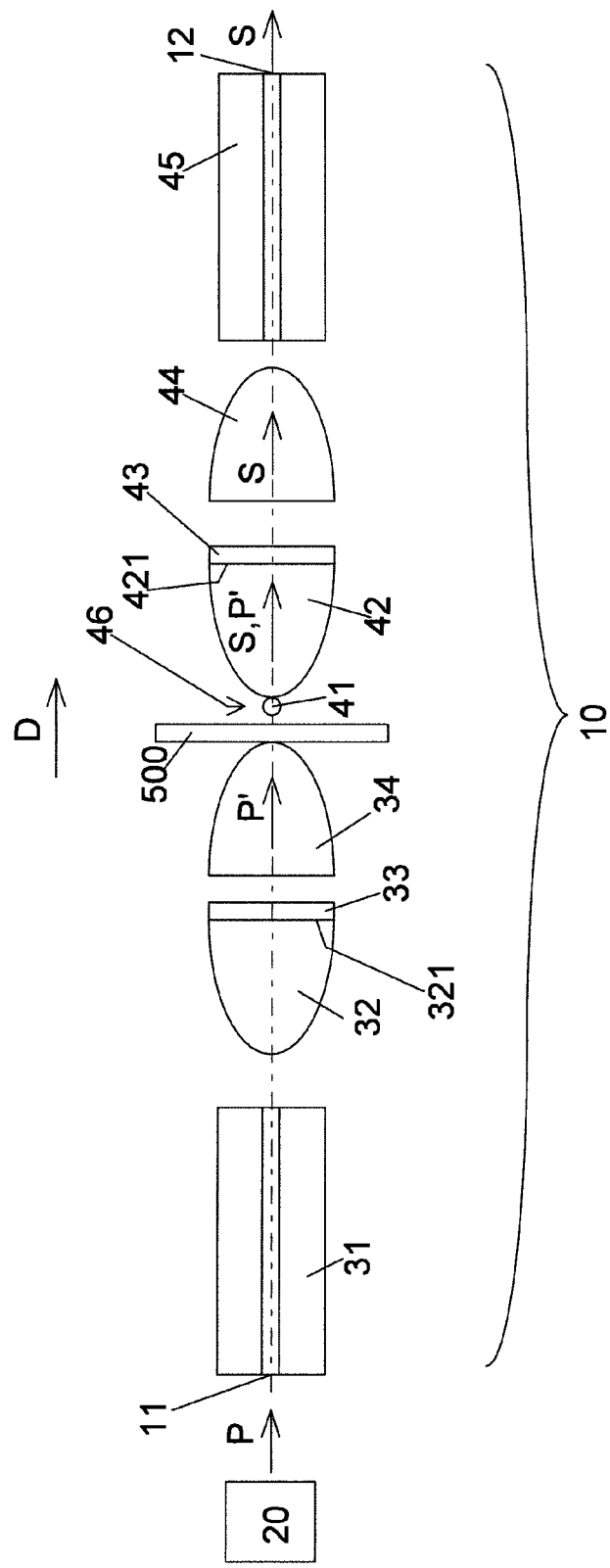

FIG. 7 shows a seventh exemplary embodiment that largely corresponds to the first embodiment shown in FIG. 1. In contrast to the latter, the embodiment of FIG. 7 comprises an additional filter 500 which is positioned between the single photon emitter 41 and the proximal end 11, for instance between the single photon emitter 41 and the lens 34. The filter 500 reflects single photons emitted by the single photon emitter 41 towards the distal end 12.

The waveguides 31, 45, 110, and 155 as shown in FIGS. 1 and 2 may be fibers such as singlemode fibers or multimode fibers.

REFERENCE SIGNS 10 single photon emission system
11 proximal end
12 distal end
20 external pump laser
30 first subsystem
31 first waveguide
32 first lens
321 flat surface
33 first filter
34 second lens
40 second subsystem 41 single photon emitter
42 lens
421 flat surface
43 filter
44 lens
45 waveguide
46 material
100 single photon emission system
101 proximal end
102 distal end
110 first waveguide
115 first lens
120 first filter
125 second lens
130 single photon emitter
135 third lens
140 fourth lens
145 second filter
150 fifth lens
155 second waveguide
160 flat surface
165 material
170 subsystem
175 subsystem
200 single photon emission system
201 proximal end
202 distal end
210 first waveguide
215 first filter
220 single photon emitter
225 second filter
230 second waveguide
235 plane surface
240 plane surface
245 material
260 first subsystem
265 second subsystem
300 single photon emission system
301 proximal end
302 distal end
310 first waveguide
315 first filter
320 single photon emitter
325 second filter
330 second waveguide
335 curved surface
340 curved surface
340' curved surface
400 single photon emission system
401 proximal end
402 distal end
410 first waveguide
415 light shade
420 focus system
425 single photon emitter
430 second waveguide
435 filter
460 main axis
465 subsystem
470 subsystem
500 filter
D direction
P optical pump radiation
P' filtered optical pump radiation
S single photons

The invention claimed is:

1. Single photon emission system comprising:
a proximal end;
a distal end; and
a single photon emitter between the proximal end and the distal end,
wherein the single photon emission system is configured to guide optical pump radiation along a predefined direction that runs from the proximal end to the distal end, said optical pump radiation being input at the proximal end to optically excite the single photon emitter, and
wherein single photons emitted by said single photon emitter and the optical pump radiation are guided together along said predefined direction to the distal end.

2. Single photon emission system according to claim 1, wherein the photon emission system comprises a section where the refractive index increases along said predefined direction.

3. Single photon emission system according to claim 2, wherein the single photon emitter is in said section.

4. Single photon emission system according to claim 3, wherein a first material and a second material are adjacent to the single photon emitter,
wherein the first material is closer to the proximal end than the second material, and has a lower refractive index than the second material.

5. Single photon emission system according to claim 4, wherein the single photon emitter is at a surface of a lens.

6. Single photon emission system according to claim 5, wherein said lens has a flat surface, and the single photon emitter is at the flat surface of said lens.

7. Single photon emission system according to claim 5, wherein said lens is a solid immersion lens or a gradient index lens.

8. Single photon emission system according to claim 1, further comprising:
a first subsystem connected to the proximal end and configured to guide the optical pump radiation along the predefined direction; and
a second subsystem optically coupled to said first subsystem and configured to guide the single photons emitted by the single photon emitter along said predefined direction to the distal end.

9. Single photon emission system according to claim 8, wherein the single photon emitter is at or adjacent to an interface between the first subsystem and the second subsystem.

10. Single photon emission system according to claim 8, wherein the first subsystem comprises a filter configured to attenuate fluorescence radiation generated inside the first subsystem in response to the optical pump radiation.

11. Single photon emission system according to claim 8, wherein the second subsystem comprises a filter configured to attenuate the optical pump radiation.

12. Single photon emission system according to claim 1, further comprising a filter configured to reflect the optical pump radiation and create an optical pump radiation field maximum at a location of the single photon emitter.

13. Single photon emission system according to claim 1, further comprising a first fiber and a second fiber each having an end facet, wherein the single photon emitter is between the end facets of the first fiber and the second fiber.

14. Single photon emission system according to claim 13, wherein a filter is at the end facet of the first fiber, said filter being configured to attenuate fluorescence radiation generated inside the first fiber in response to the optical pump radiation.

15. Single photon emission system according to claim 13, wherein a filter is at the end facet of the second fiber, said filter being configured to attenuate the optical pump radiation.

16. Single photon emission system according to claim 13,
wherein the end facets of the first fiber and the second fiber have at least partly curved surfaces; and
wherein the single photon emitter is between the curved surfaces of said end facets of the first fiber and the second fiber.

17. Single photon emission system according to claim 8,
wherein the first subsystem comprises a first fiber having an end facet at an interface between the first and second subsystem;
wherein the second subsystem comprises a second fiber having an end facet at the interface between the first and second subsystem; and
wherein a first filter is at the end facet of the first fiber, said first filter being configured to attenuate fluorescence radiation generated inside the first fiber in response to the optical pump radiation and reflect the single photons emitted by the single photon emitter.

18. Single photon emission system according to claim 17,
wherein a second filter is at the end facet of the second fiber, said second filter being configured to attenuate the optical pump radiation and reflect the single photons emitted by the single photon emitter;
wherein the reflection of the second filter is lower than the reflection of the first filter.

19. Single photon emission system according to claim 1, wherein a light shade is in the radiation path, said light shade attenuating an inner section of the radiation beam of the optical pump radiation.

20. Single photon emission system according to claim 1,
wherein the system is configured to guide the optical pump radiation along only the predefined direction from the proximal end to the distal end, and
wherein the single photons and the optical pump radiation exit the single photon emission system at the distal end.

\* \* \* \* \*